United States Patent
Loychik et al.

(10) Patent No.: US 10,271,115 B2
(45) Date of Patent: Apr. 23, 2019

(54) NODAL DYNAMIC DATA ACQUISITION AND DISSEMINATION

(71) Applicant: ITT MANUFACTURING ENTERPRISES LLC., Wilmington, DE (US)

(72) Inventors: Neil Loychik, Victor, NY (US); Daniel J. Kernan, Liverpool, NY (US)

(73) Assignee: ITT Manufacturing Enterprises LLC., Wilmington, DE (US)

( * ) Notice: Subject to any disclaimer, the term of this patent is extended or adjusted under 35 U.S.C. 154(b) by 136 days.

(21) Appl. No.: 14/681,577

(22) Filed: Apr. 8, 2015

(65) Prior Publication Data

US 2016/0301991 A1    Oct. 13, 2016

(51) Int. Cl.
| | |
|---|---|
| H04Q 9/00 | (2006.01) |
| G01H 1/00 | (2006.01) |
| H04W 4/38 | (2018.01) |
| H04W 4/00 | (2018.01) |

(52) U.S. Cl.
CPC ............... H04Q 9/00 (2013.01); G01H 1/00 (2013.01); *G08C 2201/93* (2013.01); *H04Q 2209/40* (2013.01); *H04W 4/006* (2013.01); *H04W 4/38* (2018.02)

(58) Field of Classification Search
None
See application file for complete search history.

(56) References Cited

U.S. PATENT DOCUMENTS

| | | | | |
|---|---|---|---|---|
| 5,602,749 A * | 2/1997 | Vosburgh | ........... | G05B 23/0221 340/679 |
| 5,943,634 A * | 8/1999 | Piety | ...................... | B23Q 17/12 700/280 |
| 6,507,804 B1 * | 1/2003 | Hala | ....................... | G01H 1/003 702/182 |
| 6,789,025 B2 * | 9/2004 | Boerhout | ............... | G01H 1/003 702/35 |
| 7,050,813 B1 * | 5/2006 | Paiz | ....................... | H04M 15/00 379/114.01 |

(Continued)

FOREIGN PATENT DOCUMENTS

| | | |
|---|---|---|
| CN | 102435302 A | 5/2012 |
| JP | 2006211232 A * | 8/2006 |
| WO | 2011104433 | 9/2011 |

*Primary Examiner* — Chico A Foxx
(74) *Attorney, Agent, or Firm* — Ware, Fressola, Maguire & Barber LLP

(57) ABSTRACT

Apparatus is provided having a signal processor configured to: respond to stimuli caused by a vibrating machine or structure and capture a sampled data set containing information about the stimuli, including where the stimuli include at least vibration of the vibrating machine or structure; and determine wireless signaling containing a preselected subset of information from the sampled data set that can be provided as relevant data that includes a relevant data package/sample, the size of the relevant data package/sample, and computations upon the relevant data package/sample, based upon implementing a data interpretation algorithm that uses a wireless communication capacity or protocol for communication. The apparatus may include a data collector or sensor having the signal processor arranged therein and configured for coupling to the vibrating machine or structure to be monitored.

39 Claims, 9 Drawing Sheets

(56) References Cited

U.S. PATENT DOCUMENTS

| | | | |
|---|---|---|---|
| 7,093,492 B2 | 8/2006 | Treiber et al. | |
| 7,424,403 B2* | 9/2008 | Robinson | G01H 1/00 340/3.1 |
| 7,456,770 B2* | 11/2008 | Cairns | H03M 3/468 341/143 |
| 8,154,417 B2 | 4/2012 | Hauenstein et al. | |
| 8,297,123 B2* | 10/2012 | Howard | G01H 11/00 73/584 |
| 8,456,325 B1* | 6/2013 | Sikora | G08G 1/087 340/909 |
| 8,565,967 B2* | 10/2013 | Steiner | B60C 23/0459 701/34.4 |
| 9,330,560 B2* | 5/2016 | Lawson | G08C 17/02 |
| 9,791,422 B2* | 10/2017 | Bowers | G01N 29/46 |
| 2003/0130811 A1* | 7/2003 | Boerhout | G05B 23/0235 702/56 |
| 2004/0015318 A1* | 1/2004 | Heller | G01K 1/022 702/127 |
| 2005/0083917 A1* | 4/2005 | Okamoto | H04L 29/06 370/352 |
| 2005/0155429 A1* | 7/2005 | Griessler | G01M 13/045 73/593 |
| 2006/0167638 A1* | 7/2006 | Murphy | G08C 17/00 702/56 |
| 2006/0171625 A1* | 8/2006 | Jones | G01M 13/045 384/624 |
| 2006/0291212 A1* | 12/2006 | Forsman | G10H 1/0016 362/276 |
| 2007/0242688 A1* | 10/2007 | McFarland | H04L 12/2803 370/445 |
| 2008/0082296 A1* | 4/2008 | Robinson | G01H 1/00 702/182 |
| 2009/0161653 A1* | 6/2009 | Kumar | H04L 7/041 370/350 |
| 2010/0042343 A1* | 2/2010 | Kuchler | G01H 1/12 702/56 |
| 2011/0004072 A1* | 1/2011 | Fletcher | A61B 5/0002 600/300 |
| 2011/0034194 A1* | 2/2011 | Han | H04W 74/0808 455/509 |
| 2011/0291850 A1* | 12/2011 | Sun | G01H 1/003 340/683 |
| 2012/0035885 A1* | 2/2012 | Tarassenko | G01H 1/006 702/183 |
| 2012/0106319 A1* | 5/2012 | Staring | H04L 69/26 370/216 |
| 2012/0111115 A1* | 5/2012 | Ume | G01N 29/2418 73/588 |
| 2012/0156034 A1* | 6/2012 | Sabannavar | G01M 13/028 416/1 |
| 2012/0173171 A1* | 7/2012 | Bajwa | G01H 11/06 702/56 |
| 2012/0176239 A1 | 7/2012 | Preden et al. | |
| 2012/0209569 A1* | 8/2012 | Becourt | G05B 23/0283 702/183 |
| 2013/0090853 A1* | 4/2013 | Anderson | G06Q 50/02 702/6 |
| 2013/0214909 A1* | 8/2013 | Meijers | H04W 4/008 340/10.5 |
| 2013/0217333 A1* | 8/2013 | Sprigg | H04W 4/008 455/41.2 |
| 2013/0243190 A1* | 9/2013 | Yang | H04L 9/0816 380/44 |
| 2014/0028462 A1* | 1/2014 | Lawson | G08C 17/02 340/870.01 |
| 2014/0129178 A1* | 5/2014 | Meduna | G06F 17/00 702/189 |
| 2014/0202126 A1* | 7/2014 | Depestel | A01D 75/18 56/10.2 J |
| 2014/0280388 A1* | 9/2014 | Fox | G06F 17/30091 707/812 |
| 2014/0282015 A1 | 9/2014 | Nixon et al. | |
| 2015/0035683 A1* | 2/2015 | Hyde | H04Q 9/00 340/870.07 |
| 2015/0050880 A1* | 2/2015 | Choi | H04W 76/10 455/39 |
| 2015/0137995 A1* | 5/2015 | Kurihara | H04W 4/006 340/870.07 |
| 2015/0142322 A1* | 5/2015 | Okamoto | G01V 1/008 702/15 |
| 2015/0310723 A1* | 10/2015 | Pinkerton | G08B 21/182 340/870.09 |
| 2015/0320315 A1* | 11/2015 | Sicurello | H04Q 9/00 340/870.07 |
| 2016/0048110 A1* | 2/2016 | Hilemon | G08B 21/02 700/12 |
| 2016/0086455 A1* | 3/2016 | Leigh | G08B 5/36 340/815.4 |
| 2016/0245279 A1* | 8/2016 | Pal | F04B 51/00 |
| 2016/0245686 A1* | 8/2016 | Pal | G01M 13/045 |
| 2016/0370259 A1* | 12/2016 | Loverich | G01M 13/00 |

\* cited by examiner

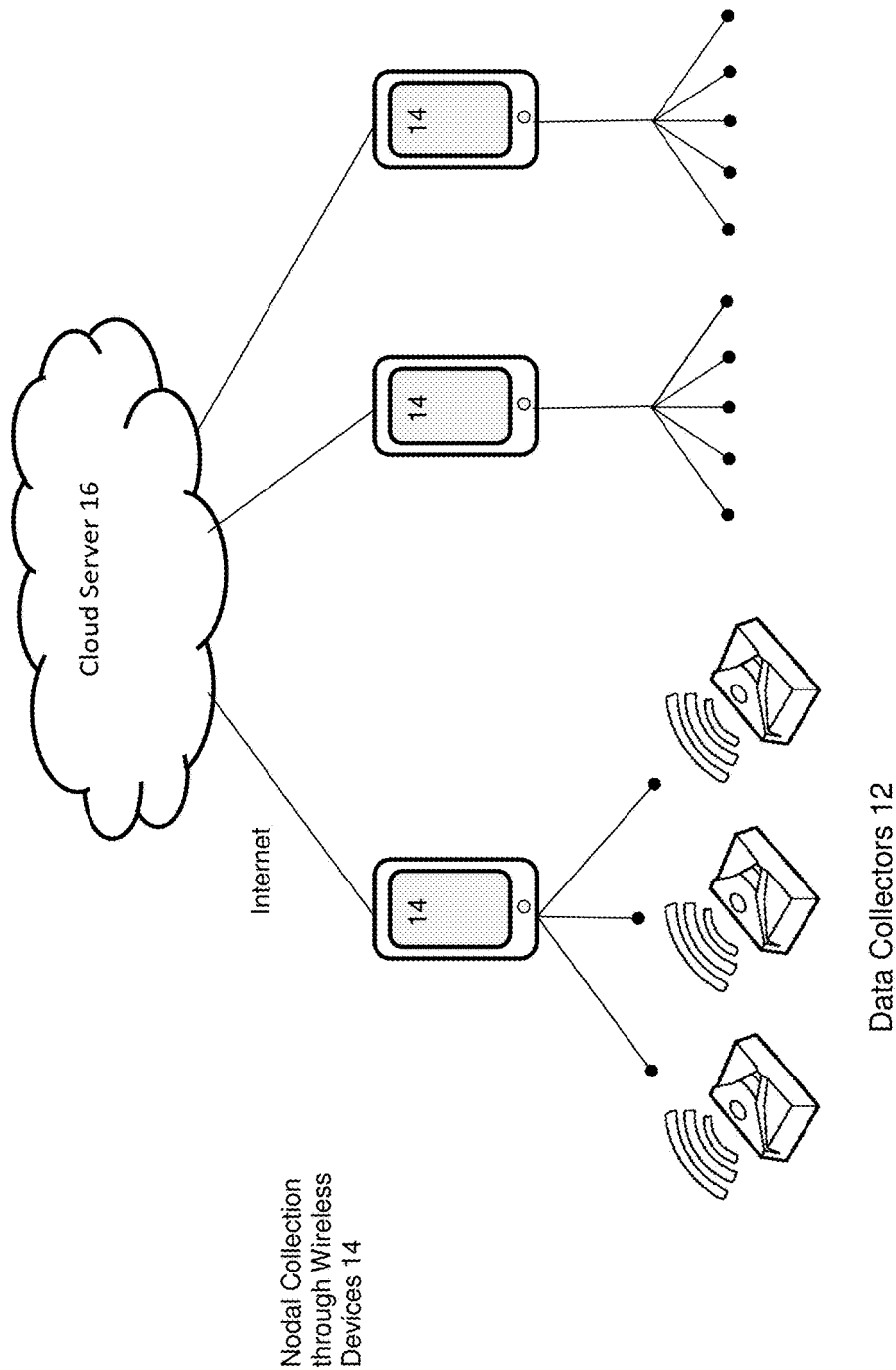
Figure 2A: Nodal Dynamic Data Acquisition and Dissemination

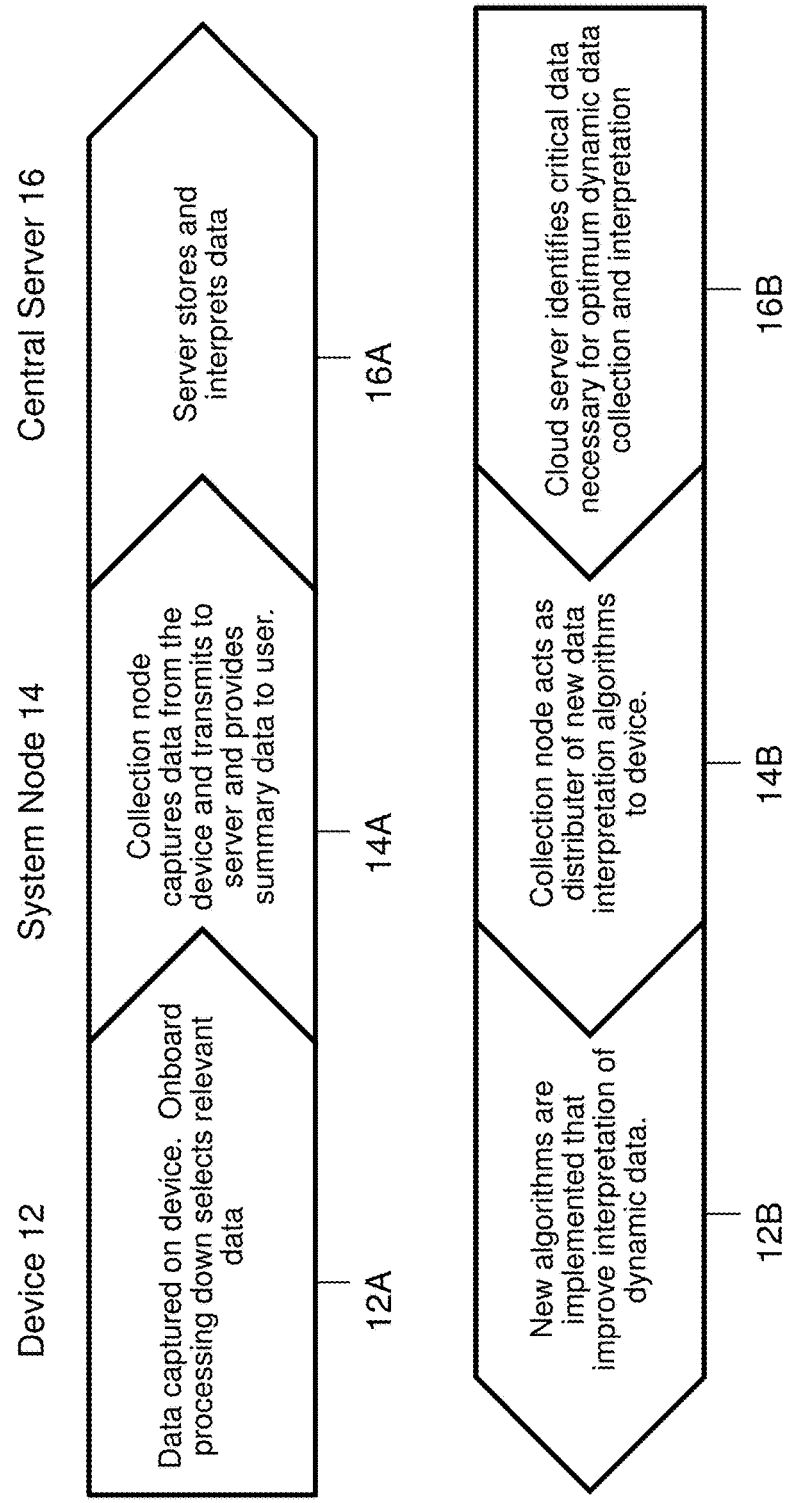

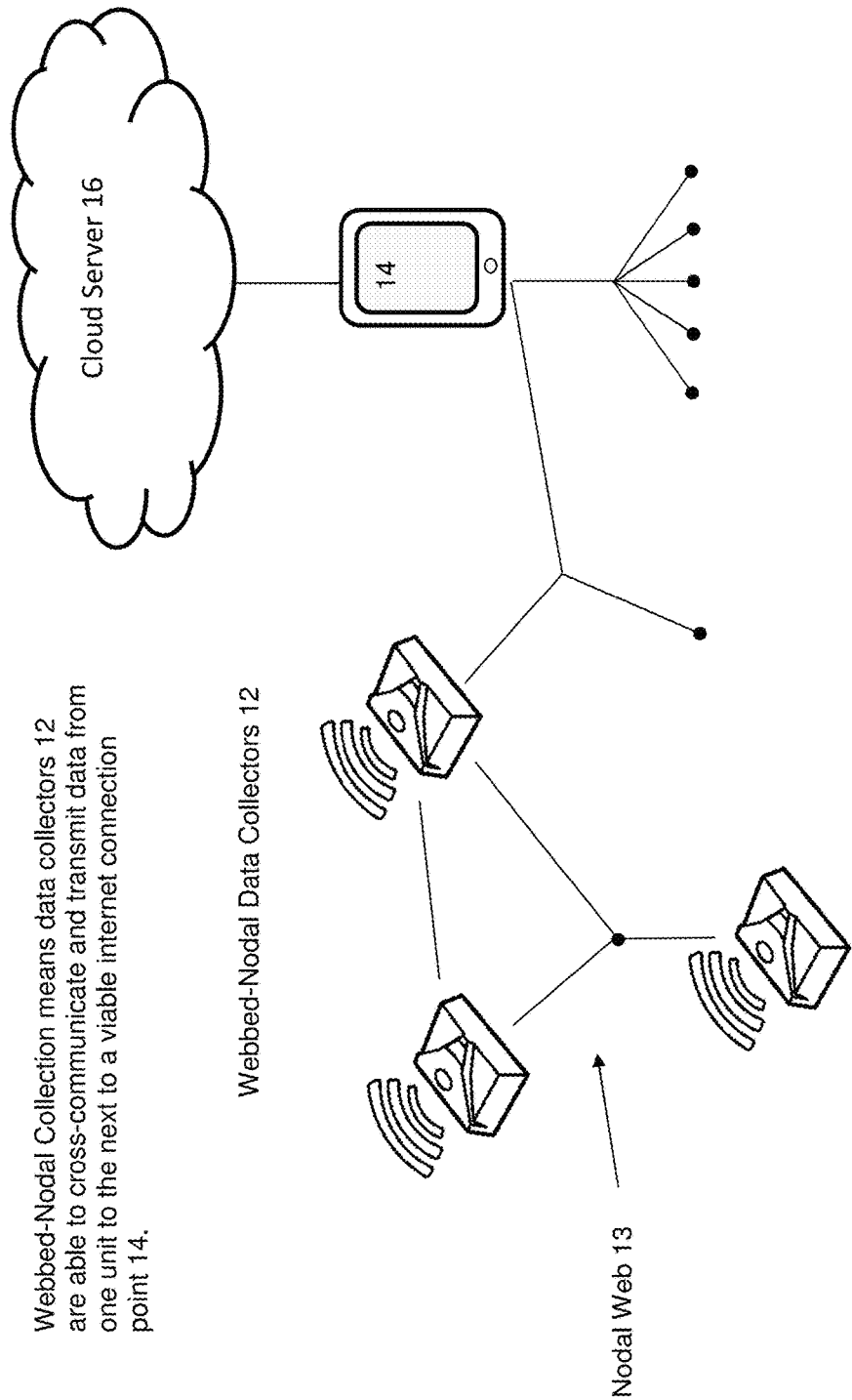
Figure 3A: Nodal Dynamic Data Acquisition and Dissemination

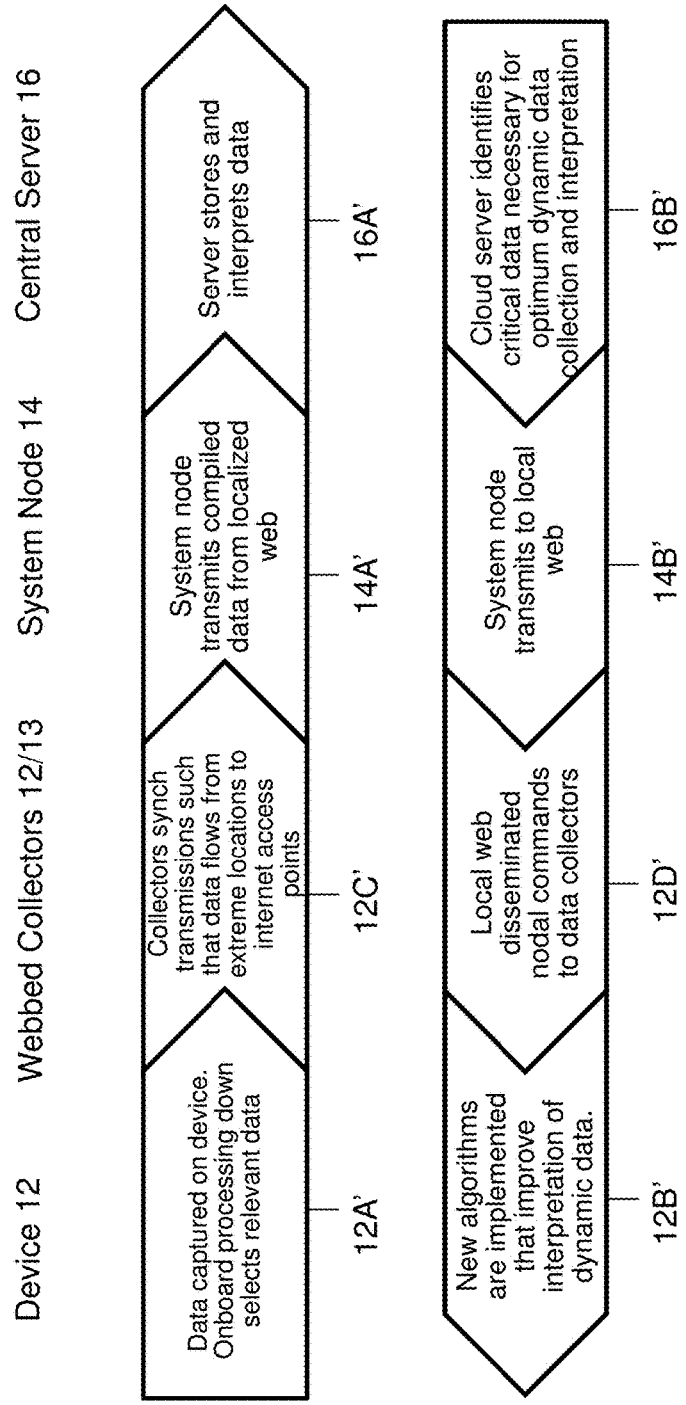

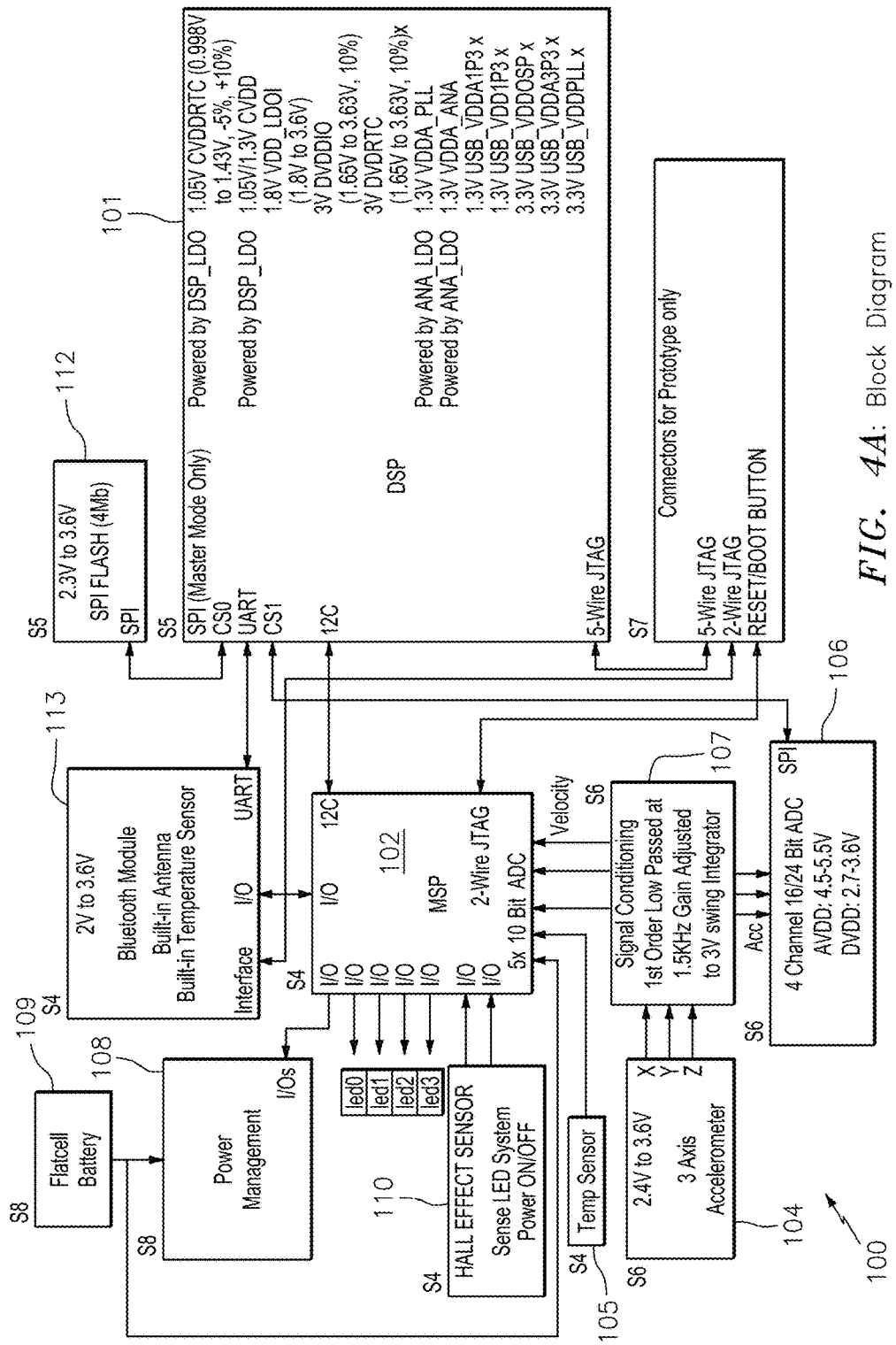
FIG. 4A: Block Diagram

NODAL DYNAMIC DATA ACQUISITION AND DISSEMINATION

BACKGROUND OF THE INVENTION

1. Field of the Invention

This application relates to a technique for monitoring a vibrating machine or structure; and more particularly to a technique for monitoring multiple vibrating machines or structures using data collectors or sensors.

2. Brief Description of Related Art

Techniques for monitoring a vibrating machine or structure are known in the art. By way of example, a handheld vibration analyzer is known in the art, e.g., that requires a person to use and perform an interpretation based on readings provided from the handheld vibration analyzer. Alternatively, a monitoring system is also known in the art, e.g., that is a very expensive permanent installation. Both techniques are susceptible to inconsistent measurements due to different data collection and handling. In addition, the processing of a large data set is not feasible across the industry and available sources using current known techniques.

See also U.S. Pat. No. 8,154,417, which discloses a compact self-contained condition monitoring device, is assigned to the assignee of the present application, and is incorporated hereby by reference. In operation, the compact self-contained condition monitoring device is coupled to a vibrating machine, senses vibration along multiple axes in relation the vibrating machine, as well as the temperature thereof, processing signaling containing information about the same, and monitors the condition of the vibrating machine based upon said signaling processed.

SUMMARY OF THE INVENTION

The present invention provides new and unique techniques for monitoring a vibrating machine or structure, and more particularly provides a new and unique technique for monitoring multiple vibrating machines or structures using multiple data collectors or sensors.

The Apparatus

According to some embodiments, the present invention may take the form of apparatus comprising a signal processor configured to:
  respond to stimuli caused by a vibrating machine or structure and capture a sampled data set containing information about the stimuli, including where the stimuli include at least vibration of the vibrating machine or structure; and
  determine wireless signaling containing a pre-selected subset of information from the sampled data set that can be provided as relevant data that includes a relevant data package/sample, the size of the relevant data package/sample, and computations upon the relevant data package/sample, based upon implementing a data interpretation algorithm that uses a wireless communication capacity or protocol for communication.

The apparatus may include at least one data collector, sensor or device having the signal processor arranged therewith and being configured for mechanical coupling to the vibrating machine or structure to be monitored, e.g., including a pump or rotary device.

In summary, the present invention is based upon selecting a subset of information that the at least one data collector, sensor or device can provide, as so-called "Relevant Data". By way of example, this may be due to the limited communication capacity (e.g., bandwidth or time) from the at least one data collector, sensor or device, e.g., to a wireless access point, then to a central or cloud server. By way of example, this so-called "Relevant Data" may be preset to be representative and sufficient for most vibrating machine or structure monitoring device situations. However, depending on the application or type of "vibrating machine or structure" monitored, the "Relevant Data" may turn out to be not that "relevant" and it may be determined that a different subset of information may be more effective for analysis and conclusions. Accordingly, via a back communication channel, the "Relevant Data" may be re-defined in the data collector, sensor or device. In operation, relevant data acquisition overcomes the limited bandwidth and/or Internet access, and the backchannel communication improves the relevant data over time.

In order to implement the nodal dynamic data acquisition and dissemination techniques, the present invention may include one or more of the following features:

The signal processor may be configured to provide the wireless signaling containing the relevant data, e.g., either to another data collector or sensor or to a system or collection node, for further signal processing and/or provisioning to a central or cloud server.

The pre-selected subset of information may be representative and sufficient for most situations for monitoring such a vibrating machine or structure. For example, depending on a particular vibrating machine or structure to be monitored, a particular sampled data set containing information about a particular stimuli may be captured, and a particular pre-selected subset of information may be determined from the particular sampled data set and provided as particular relevant data for the particular vibrating machine or structure.

The signal processor may be configured to receive, e.g., via the back communication channel, wireless control signaling containing information to change the content of the pre-selected subset of information based upon continuous evaluation of the relevance of the pre-selected subset of information.

The apparatus may include a system or collection node comprising a system or collection node signal processor configured to receive and provide, e.g., via the back communication channel, the wireless control signaling to the at least one data collector, sensor or device.

The transmission of the wireless signaling is limited by either available bandwidth or time related to the wireless communication capacity or protocol.

The signal processor may be configured to provide the wireless signaling as a stream of real time or stored data.

The apparatus may include multiple data collectors or sensors, each data collector or sensor having a respective signal processor and being mechanically coupled to a respective vibrating machine or structure to be monitored, each signal processor being configured to provide respective wireless signaling containing a respective pre-selected subset of information that can be provided as respective relevant data, including when some measurements are made with respect to other measurements.

The multiple data collectors or sensors may be configured to be synched to provide transmissions of the respective wireless signaling, e.g., including when the transmissions are across an industrial plant and in the form of a webbed-node collection to a base station.

The System or Collection Node

The system or collection node may include a system or collection node signal processor configured to receive the wireless signaling by the data collector or sensor and identify or downselect the relevant data received in the wireless signaling; determine system or collection node signaling containing the relevant data; and either provide the system or collection node signaling containing the relevant data, e.g., to a central or cloud server, or provide summary relevant data to a user, or provide both.

The system or collection node may include, or take the form of, a wireless device, e.g., including where the wireless device is a smart phone, iPad, tablet, laptop computer, desktop computer, personal digital assistant (PDA) device, router, wireless repeater, base station, etc. The wireless device may be configured to implement an application or app to display the summary data to the user.

The wireless device may be configured with Internet communications protocol capability.

The apparatus may include the system or collection node, according to some embodiment of the present invention.

The Central or Cloud Server

The central or cloud server may include a central or cloud signal processor configured to receive the system or collection node signaling, and store and interpret the relevant data; identify critical data necessary for optimum dynamic data collection and interpretation, and determine central or cloud server signaling containing information about a new or updated data interpretation algorithm; and/or provide the central or cloud server signaling, e.g., to the system or collection node containing the new or updated data interpretation algorithm. In operation, the central or cloud server may periodically adapt the relevant data based upon the specific kind of vibrating machine or structure and the specific kind of application in which the specific kind of vibrating machine or structure is operating and provide adapted relevant data to the data collectors or sensors via a back communication channel.

Regarding the functionality associated with identifying critical data necessary for optimum dynamic data collection and interpretation, the term "identify" may be understood to mean and include embodiments where the central or cloud server commands the system and collection node of minimum or updated parameters, e.g., by not making an interpretation if no data is present. Alternatively, the term "identify" may be understood to mean and include embodiments where the central or cloud server may automatically determine "relevant" data, and accordingly command the system and collection node.

Regarding dissemination, the central or cloud server may be configured to disseminate vibration data to other parts of the apparatus either automatically or with user requests, e.g., data collected may be transmitted from a remote location via another location for viewing.

The apparatus may include the central or cloud server, according to some embodiment of the present invention.

System-Nodal Collection Technique

In a system-nodal collection technique according to the present invention, the system or collection node may also be configured to act as a distributor of new data interpretation algorithms to the data collector or sensor. Moreover, each system or collection node may be configured to receive respective wireless signaling from a group of data collectors or sensors, identify the relevant data, and provide the system or collection node signaling to the central or cloud server, as well as provide summary relevant data to the user.

Webbed-Nodal Collection Technique

The webbed-nodal collection technique may also include one or more of the following features:

In the webbed-nodal collection technique, the system or collection node may be configured to transmit respective nodal commands to a local or nodal web of one or more data collectors or sensors, which are distributed as local web disseminated nodal commands to the data collectors or sensors within the local or nodal web.

The multiple data collectors may be configured with a webbed-nodal connection so that the multiple data collectors are able to cross-communicate and transmit the respective relevant data from one data collector or sensor at one location to a next data collector or sensor at a next location to a viable Internet connection point at another location.

Each multiple data collector or sensor may be configured to implement a webbed-nodal connection algorithm to enable each multiple data collector to cross-communicate and transmit the respective relevant data received from a respective one data collector or sensor to either a respective next data collector or sensor or the viable Internet connection point.

The multiple data collectors or sensors may be configured to synch data collector transmission signaling so that the respective relevant data from each multiple data collector or sensor flows from respective locations to Internet access points, including where the multiple data collectors or sensors and the Internet access points form a localized web having webbed data collectors or sensors.

The apparatus may include the system or collection node having the system or collection node signal processor configured to receive the data collector transmission signaling and provides system or collection node signaling containing information about compiled respective relevant data from each multiple data collector or sensor.

The apparatus may include the central or cloud server having the central or cloud server signal processor configured to receive the system or collection node signaling and store and interpret the compiled respective relevant data from each multiple data collector or sensor.

The multiple data collectors or sensors may be configured to provide local web disseminated commands to the webbed data collectors, e.g., including where the local web disseminated commands contain a new or updated data interpretation algorithm in order to implement modified or optimum dynamic data collection and interpretation so as to re-define the pre-selected subset of information and improve the interpretation of dynamic data in comparison to the relevant data previously collected and interpreted. The modified data collection and interpretation is understood to be a dynamic, adaptive or improved data collection and interpretation scheme when compared to the previous data collection and interpretation it is understood to replace.

The respective signal processor may be configured to receive the local web disseminated commands containing the new or updated data interpretation algorithm and implement the optimum dynamic data collection and interpretation so as to re-define the pre-selected subset of information and improve the interpretation of dynamic data in comparison to the relevant data previously collected and interpreted.

The Method

According to some embodiments, the present invention may take the form of a method including steps for responding with a signal processor to stimuli caused by a vibrating machine or structure and capturing a sampled data set containing information about the stimuli, including where the stimuli include at least vibration of the vibrating machine or structure; and determine with the signal processor wireless signaling containing a pre-selected subset of information from the sampled data set that can be provided as relevant data that includes a relevant data package/sample, the size of the relevant data package/sample, and computations upon the relevant data package/sample, based upon implementing a data interpretation algorithm that uses a wireless communication capacity or protocol for communication.

According to some embodiments of the present invention, the method may also include implementing one or more of the features set forth above and herein.

Advantages

In effect, by combining nodal data collection and telemetry means, one can effectively measure many vibrating machines, structures or devices, e.g., without the need for permanent installations or frequent human interaction, including where the term "telemetry" is understood to mean a highly automated communications process by which measurements are made and other data collected at remote or inaccessible points and transmitted to receiving equipment for monitoring.

The present invention reduces the human interaction and training required to operate, and also reduces the need for power and/or Intranet and/or Internet access to effectively communicate to and from a dynamic source.

The present invention also provides consistent measurement from collector, sensor or device to collector, sensor or device.

The present invention also makes feasible the processing of a large data set across the industry and available sources.

The present invention also permits refinement and improvement of dynamic algorithms that are superior.

BRIEF DESCRIPTION OF THE DRAWING

The drawing includes the following Figures:

FIG. 2A is a diagram of apparatus for implementing nodal dynamic data acquisition and dissemination using a system-nodal collection technique, according to some embodiments of the present invention.

FIG. 2B is a diagram of data flow, e.g., related to the apparatus in FIG. 2A, including such data flow between a data collector or sensor device, a system or collection node and a central or cloud server, according to some embodiments of the present invention.

FIG. 3A is a diagram of apparatus for implementing nodal dynamic data acquisition and dissemination using a webbed-nodal collection technique, according to some embodiments of the present invention.

FIG. 3B is a diagram of data flow, e.g., related to the apparatus in FIG. 3A, including such data flow between a data collector or sensor device, webbed collectors, a system or collection node and a central or cloud server, according to some embodiments of the present invention.

FIG. 4A is a block diagram of a hardware system/configuration, according to some embodiments of the present invention.

DETAILED DESCRIPTION OF THE INVENTION

Figure 1:
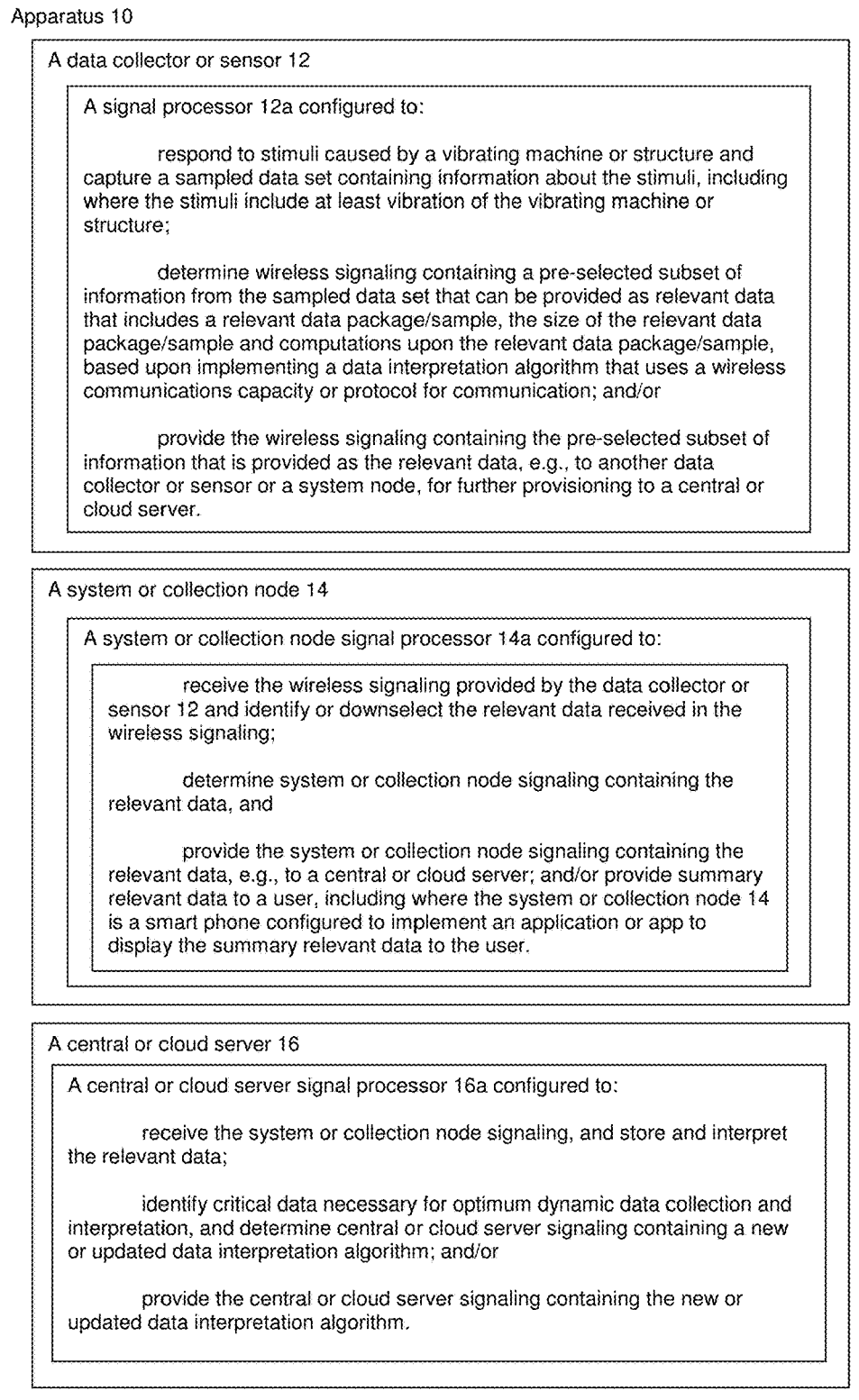
FIG. 1 is a block diagram of apparatus according to some embodiments of the present invention.

FIG. 1: The Basic Apparatus 10

By way of example, FIG. 1 shows apparatus 10 for implementing a nodal dynamic data acquisition and dissemination, according to some embodiments of the present invention. The apparatus 10 may include some combination of one or more data collector, sensor or device 12, a system or collection node 14 and a central or cloud server 16, for monitoring one or more vibrating machines or structures, e.g., such as a pump or rotary device.

The Signal Processor 12

By way of example, and consistent with that shown in FIG. 1, the collector or sensor 12 may include a signal processor 12a configured at least to:

respond to stimuli caused by the vibrating machine or structure and capture a sampled data set containing information about the stimuli, e.g., including where the stimuli include at least vibration of the vibrating machine or structure; and determine wireless signaling containing a pre-selected subset of information from the sampled data set that can be provided as relevant data that includes a relevant data package/sample, the size of the relevant data package/sample, and computations upon the relevant data package/sample, e.g., based upon implementing a data interpretation algorithm that uses a wireless communication capacity or protocol for communication.

The apparatus 10 may include the data collector or sensor 12 having the signal processor 12a arranged therein and configured for mechanically coupling to the vibrating machine or structure to be monitored.

The signal processor 12a may be configured to provide the wireless signaling containing the relevant data, e.g., either to another data collector or sensor like element 12 or to the system or collector node like element 14, consistent with that disclosed herein.

The pre-selected subset of information may be representative and sufficient for most situations for monitoring the vibrating machine or structure. For example, depending on a particular type or class of vibrating machine or structure to be monitored, a particular sampled data set containing information about a particular stimuli may be captured, and a particular pre-selected subset of information may be determined from the particular sampled data set and provided as particular relevant data for the particular vibrating machine or structure. By way of example, the reader is referred to the discussion below regarding "Sampled Data."

The signal processor 12a may be configured to receive, e.g., via a back communication channel, wireless control signaling containing information to change the content of the pre-selected subset of information based upon continuous evaluation of the relevance of the pre-selected subset of information. By way of example, and consistent with that which would be appreciate by a person skilled in the art, the back communication channel may be a downstream channel having a communication frequency that is different than the corresponding upstream communication frequency for exchanging signaling between the data collector or sensor 12, the system or collection node 14, the central or collection node 16, and/or any frequency channel for exchanging associated signaling between the data collectors or sensors 12 in any nodal web 13 (see FIG. 3A). In effect, the scope of the invention is not intended to be limited to the type or kind of back communication channel or frequency to be used herein.

The system or collection node 14 may include a system or collection node signal processor 14a configured to receive and provide, e.g., via the back communication channel, system or collection node signaling containing the wireless control signaling having the information to the at least one data collector, sensor or device 12.

The transmission of the wireless signaling is limited, e.g., by either available bandwidth or time related to the wireless communication capacity or protocol. The scope of the invention is not intended to be limited to any particular available bandwidth or time constraint in which the pre-selected subset of information may be implemented, e.g., including available bandwidth or time related to the wireless communication capacity or protocol either now known or later developed in the future.

Consistent with that set forth herein, the signal processor 12a may be configured to provide the wireless signaling as a stream of real time or stored data.

Moreover, consistent with that set forth below, including that shown in FIGS. 2A, 2B, 3A and 3B, multiple data collectors or sensors 12 may be configured to be synched to provide transmissions of respective wireless signaling, e.g., including where the transmissions are across an industrial plant and in the form of a webbed-node collection to any such base station.

The System or Collection Node 14

The system or collection node 14 may include a system or collection node signal processor 14a configured to receive the wireless signaling by the data collector or sensor and identify or downselect the relevant data received in the wireless signaling; determine system or collection node signaling containing the relevant data; and provide either the system or collection node signaling containing the relevant data, e.g., to the central or cloud server 16, or provide summary relevant data to a user, or provide both.

The system or collection node 14 may include, or take the form of, a wireless device, e.g., including where the wireless device is a smart phone, IPad, tablet, laptop computer, desktop computer, personal digital assistant (PDA) device, router, wireless repeater, base station, etc. The wireless device may be configured to implement an application or app to display the summary relevant data to the user.

The wireless device may be configured with Internet communications protocol capability.

The Central or Cloud Server 16

The central or cloud server 16 may include a central or cloud signal processor 15a configured to receive the system or collection node signaling, and store and interpret the relevant data; identify critical data necessary for optimum dynamic data collection and interpretation, and determine central or cloud server signaling containing information about a new or updated data interpretation algorithm; and/or provide the central or cloud server signaling, e.g., to the system or collection node containing the new or updated data interpretation algorithm.

Consistent with that set forth above, the central or cloud server 16 may be configured to command the system and collection node of minimum or updated parameters, e.g., by not making an interpretation if no data is present. Alternatively, the central or cloud server 16 may be configured to automatically determine "relevant" data, and accordingly command the system and collection node 14.

According to some embodiments of the present invention, in operation the central or cloud server 16 may be configured to define "relevance," so that the system collects data that is relevant based upon the definition. Relevance may be defined for any descriptors of the vibrating machine or structure (e.g., location, model number, design parameters, etc.). The scope of the invention is intended to include embodiments in which there is no weighting factor on relevance, consistent with that set forth herein. However, the scope of the invention is intended to also include embodiments in which raw data may be passed through a data sampler (e.g., having a different sampling ratio), followed by a weighting factor (e.g. vibration in 1 axis may be understood to indicate less failure relevant to vibration in another axis), followed by some data integration (e.g., not running for single events) and then compiling the weighted individual data together for further signal processing.

FIGS. 2A and 2B: System-Nodal Collection Technique

FIGS. 2A and 2B show apparatus for implementing a system-nodal collection technique and upstream/downstream data flow, according to some embodiments of the present invention.

By way of example, FIG. 2A shows that the apparatus 10 includes multiple data collectors, sensors or devices like element 12. Each data collector or sensor 12 may be coupled mechanically to a respective vibrating machine or structure to be monitored and provide such respective wireless signaling containing a respective pre-selected subset of information that can be provided as respective relevant data. The scope of the invention is not intended to be limited to any particular manner in which the data collector or sensor 12 is mechanically coupled to the vibrating machine or structure, and is intended to include manners both now known and later developed in the future. In operation, each data collector or sensor 12 has a signal processor like element 12a (FIG. 1) that captures the sample data set, processes onboard the sample data set captured, and selects the relevant data that includes the relevant data package/sample, the size of the relevant data package/sample and computations upon the relevant data package/sample, consistent with that indicated in module 12A shown in FIG. 2B, e.g., based upon implementing a data interpretation algorithm that uses the wireless communication capacity or protocol for communication. Each data collector or sensor 12 provides the wireless signal containing the pre-selected subset of information that is provided as the relevant data, e.g., to the system or collection node 14, for further provisioning to a central or cloud server. In FIG. 2A, each system or collection node 14 receives and further processes respective wireless signaling from one or more data collectors or sensors 12.

The system or collection node signal processor 14a may also be configured to implement signal functionality related to a collection node, e.g., to capture data from the device 12 and provide summary relevant data to a user, including where the wireless device is configured to implement an application or app to display the summary relevant data to the user, consistent with that indicated in module 14A shown in FIG. 2B.

In operation, and consistent with that shown in FIG. 2B, the central or cloud server signal processor 16a may be configured to implement signal functionality related to a server, e.g., to receive the system or collection node signaling, and store and interpret the relevant data, consistent with that indicated in module 16A shown in FIG. 2B; identify critical data necessary for optimum dynamic data collection and interpretation, consistent with that indicated in module 16B shown in FIG. 2B; and provide central or cloud server signaling containing a new or updated data interpretation algorithm. The system or collection node signal processor 14a may also be configured to receive the central or cloud server signaling containing the new or updated data interpretation algorithm, act as distributor of the new data interpretation algorithms, consistent with that indicated in module 14B shown in FIG. 2B, and provide, e.g., via the back communication channel, corresponding system or collection node signaling containing the new or updated data interpretation algorithm to the device 12. The signal processor 12a may be configured to receive, e.g., via the back communication channel, the corresponding system or collection node signaling containing the new or updated data interpretation algorithm and implement the optimum dynamic data collection and interpretation so as to re-define the pre-selected subset of information and improve the interpretation of dynamic data in comparison to the relevant data previously collected and interpreted, consistent with that indicated in module 12B shown in FIG. 2B.

FIGS. 3A and 3B: Webbed-Nodal Data Collection Technique

FIGS. 3A and 3B show apparatus for implementing a webbed-nodal collection technique and upstream/downstream data flow, according to some embodiments of the present invention.

The multiple data collectors or sensors like element 12 may be configured with a webbed-nodal connection in a nodal web 13 so that the multiple data collectors or sensors 12 are able to cross-communicate and transmit the respective relevant data from one data collector or sensor 12 at one location to a next data collector or sensor at a next location to a viable Internet connection point at another location, e.g., like the system or collection node 14.

As a person skilled in the art would appreciate, each multiple data collector or sensor 12 may be configured to implement a webbed-nodal connection algorithm to enable each multiple data collector or sensor 12 to cross-communicate, select and transmit the respective relevant data received from a respective one data collector to either a respective next data collector sensor 12, or the viable Internet connection point, e.g., like the system or collection node 14, consistent with that indicated in module 12A' shown in FIG. 3B.

The multiple data collectors or sensors and/or nodal web 12/13 may be configured to synch data collector transmission signaling so that the respective relevant data from each multiple data collector or sensor 12 flows from respective locations (e.g., including extreme locations) to Internet access points, including where the multiple data collectors or sensors and the Internet access points form the localized web 13 (FIG. 3B) having webbed collectors or sensors 12, consistent with that indicated in module 12C' shown in FIG. 3B.

The system or collection node signal processor 14a may be configured to receive the data collector transmission signaling and provides system or collection node signaling containing information about compiled respective relevant data from each multiple data collector from the nodal web 13, consistent with that indicated in module 14A' shown in FIG. 3B. The central or cloud server signal processor 16a may be configured to receive the system or collection node signaling and store and interpret the compiled respective relevant data from each multiple data collector 12, consistent with that indicated in module 16A' shown in FIG. 3B.

Moreover, the central or cloud server signal processor 16a may also be configured to identify critical data necessary for optimal dynamic data collection and interpretation, and provides central or cloud server signal processor signaling containing information about a new data interpretation algorithm, consistent with that indicated in module 16B' shown in FIG. 3B. The system or collection node signal processor 14a may also be configured to receive the central or cloud server signal processor signaling, and provide the system or collection node signal processor signaling containing information such information to one or more webbed data collectors or sensors, e.g., in the nodal web 13, consistent with that indicated in module 14B' shown in FIG. 3B.

In the nodal web 13, the multiple data collectors or sensors 12 may be configured to receive the system or collection node signal processor signaling, and provide local web disseminated nodal commands to respective webbed data collectors or sensors 12, e.g., including where the local web disseminated commands contain the new or updated data interpretation algorithm in order to implement optimum dynamic data collection and interpretation so as to re-define the pre-selected subset of information and improve the interpretation of dynamic data in comparison to the relevant data previously collected and interpreted, consistent with that indicated in module 12D' shown in FIG. 3B.

The respective signal processor 12a may be configured to receive the local web disseminated commands containing the new or updated data interpretation algorithm and implement the optimum dynamic data collection and interpretation so as to re-define the pre-selected subset of information and improve the interpretation of dynamic data in comparison to the relevant data previously collected and interpreted, consistent with that indicated in module 12B' shown in FIG. 3B. It is understood that the local web disseminated commands may contain new or updated data interpretation algorithms for some respective webbed data collectors or sensors 12 but not all respective webbed data collectors or sensors 12, depending on the operating of any particular vibrating machine or structure.

The scope of the invention is also intended to include, and embodiments are envisioned, where the webbed-nodal data collection technique has additional capabilities, including providing data redundancy or more rapid transmissions of communications. By way of example, one or more neighbor nodes may be configured to provide redundant data by recording identical data to prevent data loss due to the loss of a web node. By way of further example, one or more web nodes may be configured either to communicate with redundant data via the fastest transmission path, or to communicate with redundant data on multiple devices simultaneously to increase bandwidth.

Figure 4B:
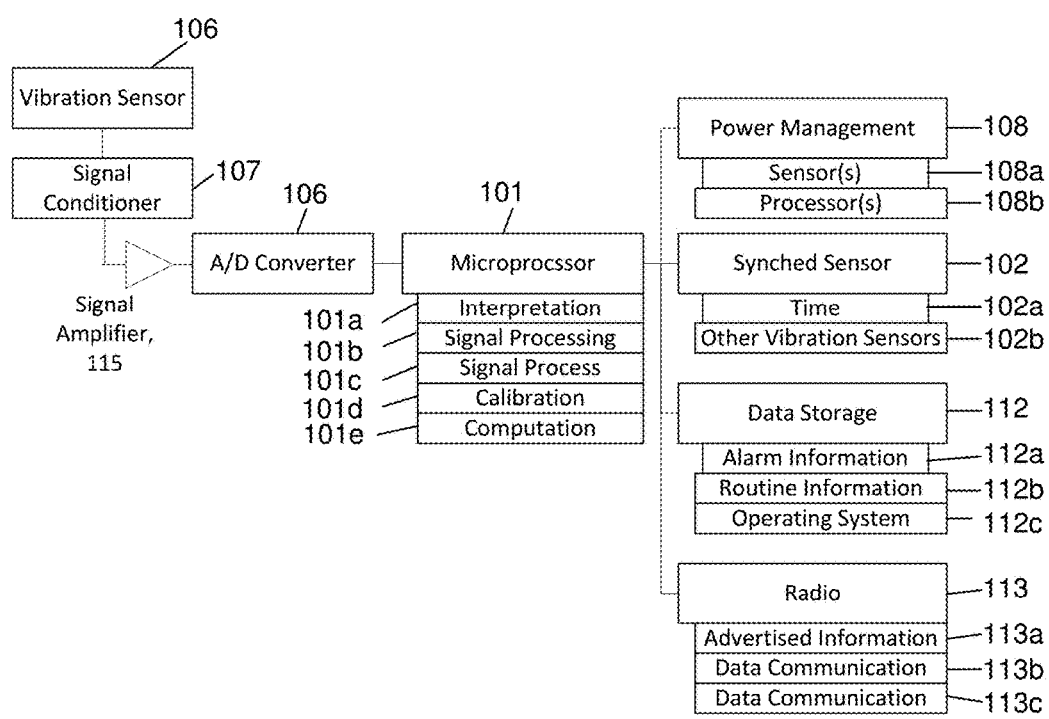
FIG. 4B is a block diagram of a hardware system/configuration with examples of associated functionality, according to some embodiments of the present invention.

FIGS. 4A and 4B

FIG. 4A shows a hardware system/configuration generally indicated as 100, and FIG. 4B shows examples of functionality associated with the hardware elements shown in FIG. 4A. In FIGS. 4A and 4B, the hardware system/configuration 100 may include a microprocessor 101, a synched sensor 102, a 3-axis accelerometer 103, a vibration sensor 104, a temperature sensor 105, a 4-channel A/D converter 106, a signal conditioner 107, a power management unit 108, a flat cell battery 109, a data storage module 112, a radio module 113, as well as a signal amplifier 115 (see FIG. 4B). In FIG. 4A, the hardware elements are coupled together via various pin connections as shown and labeled in order to implement the functionality associated with some embodiments on the present invention.

As shown in FIG. 4B, and by way of example, the microprocessor 101 may be configured to perform data interpretation functions 101a, signal process or processing functions 101b, 101c, calibration functions 101d and computation functions 101e, e.g., all consistent with that disclosed herein.

By way of example, the power management unit 108 may be configured to perform sensor(s) functions 109a and processor functions 108b, e.g., all consistent with that disclosed herein.

By way of example, the synched sensor 102 may be configured to perform time functions 102a and other vibration sensor functions 102b, e.g., all consistent with that disclosed herein.

By way of example, the data storage module 112 may be configured to perform alarm information functions 112a, routine information functions 112b and operating system functions 101c, e.g., all consistent with that disclosed herein.

By way of example, the radio module 113 may be configured to perform advertised information functions 113a and one or more data communication functions 113b, 113c, e.g., all consistent with that disclosed herein.

As a person skilled in the art would appreciate, the functions shown in FIG. 4B are provided by way of example, and the microprocessor 101, the synched sensor 102, the vibration sensor 104, the A/D converter 106, the signal conditioner 107, the power management unit 108, the data storage module 112, the radio module 113 and the signal amplifier 115 may all be configured to perform other functions not shown in FIG. 4B in order to implement the underlying functionality within the scope and spirit of the present invention disclosed herein.

Figure 5:
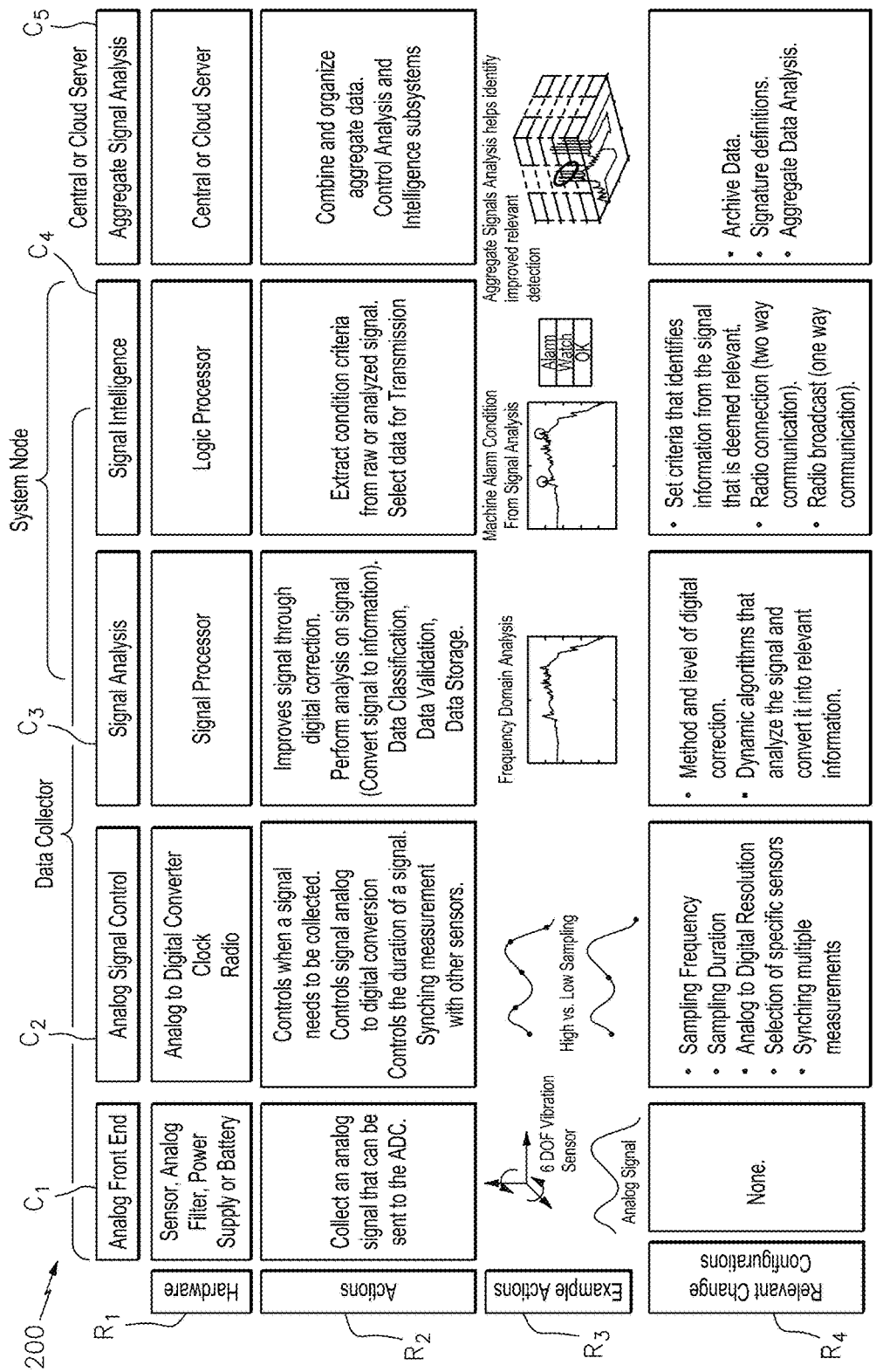
FIG. 5 is a block diagram/matrix with a summary of data collector, system node and central or cloud server functionality, which includes rows showing hardware, action, example actions and relevant change configurations, and columns showing analog front end, analog signal control, signal analysis, signal intelligence and aggregate signal analysis, according to some embodiments of the present invention.

FIG. 5: Summary of Data Collector, System Node and Central or Cloud Server Functionality FIG. 5 shows a block diagram or matrix generally indicated as 200 with a summary of data collector, system node and central or cloud server functionality, which includes rows $R_1$, $R_2$, $R_3$, $R_4$ showing the hardware, action, example actions and relevant change configurations, and which includes columns $C_1$, $C_2$, $C_3$, $C_4$, $C_5$ showing analog front end, analog signal control, signal analysis, signal intelligence and aggregate signal analysis. In order to reduce clutter, the individual row, column matrix elements like $R_1$, $C_1$; $R_1$, $C_2$; $R_1$, $C_3$; . . . ; $R_4$, $C_3$; $R_4$, $C_4$; $R_4$, $C_5$ are not separately labeled in FIG. 5 and not all separately described in the description below.

By way of example, the functionality associated with the data collector in row $R_1$ re hardware, and in column $C_1$ re its analog front end, may include, or take the form of, implementations related to a sensor, an analog filter, and power supply or battery operations.

By way of example, the functionality associated with the data collector in row $R_2$ re actions, and in column $C_1$ re its analog front end, may include, or take the form of, implementations related to collecting an analog signal that can be sent to an analog-to-digital converter, e.g., including collecting the analog signal from a 6-DOF (degree of freedom) sensor (see row $R_3$ re example actions, and column $C_1$).

By way of example, the functionality associated with the data collector in row $R_1$ re hardware, and in column $C_2$ re its analog signal control, may include, or take the form of, implementations related to an analog-to-digital converter, a clock and a radio.

By way of example, the functionality associated with the data collector in row $R_2$ re actions, and in column $C_2$ re its analog signal control, may include, or take the form of, implementations related to controlling when a signal needs to be collected, controlling the signal's analog-to-digital conversion, controlling the duration of the signal sampled, and synching measurements with other sensors, e.g., including using high versus low sampling frequencies (see $R_3$ re example actions, and column $C_2$).

Based on that shown in FIG. 5, a person skilled in the art would appreciate and understand the remaining data collector, system node and central or cloud server functionality, which includes rows $R_1$, $R_2$, $R_3$, $R_4$ showing the hardware, action, example actions and relevant change configurations, and which includes columns $C_1$, $C_2$, $C_3$, $C_4$, $C_5$ showing the remaining analog front end, analog signal control, signal analysis, signal intelligence and aggregate signal analysis, e.g., consistent with that disclosed herein.

Signal Processors 12a, 14a, 16a

Signal processors 12a, 14a, 16a may be configured to perform basic signal processing functionality for implementing the present invention. The signal processors 12a, 14a, 16a may be a stand alone signal processing module, form part of a controller, controller module, etc., or form part of some other module. Many different types and kinds of signal processors, controllers and controller modules are known in the art, for example, including programmable logic controllers, etc. By way of example, based on an understanding of such known signal processors, a person skilled in the art would be able to configure the signal processor 12a, 14a, 16a to perform the aforementioned signal processing functionality consistent with that described herein.

By way of still further example, the functionality of the signal processor may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation, including where the signal processor and a memory combine to implement a program code, e.g., stored in the memory, so as to cause the signal processor to implement the aforementioned signal processing functionality. The scope of the invention is not intended to be limited to any particular implementation using technology both now known or later developed in the future.

The signal processor, controller or controller module may include other modules to perform other functionality that is known in the art, that does not form part of the underlying invention, and that is not described in detail herein.

Sampled Data

By way of example, and consistent with that which would be understood and appreciate by a person skilled in the art, the type of sampled data set may include, or be based on, the type of stimuli (e.g., vibration along one or more translational or rotational axes), the frequency of measurement (e.g., by sub-second, seconds, minutes, hours, days, etc.) of the stimuli, the frequency of the provisioning of the measurements, e.g., from the data collector or sensor, etc. It is understood that axes are not intended to be limited to physical axes per se. Instead, an axis may be defined along different axes of a vibrating machine or structure, e.g., including multiple horizontal axes along different horizontal axis points, multiple vertical axes along different vertical axis points, and/or multiple transverse axes along different transverse axis point, multiple rotational axes along different horizontal, vertical and transverse axes, etc. In other words, any given vibrating machine or structure can be understood to have n given degrees of freedom and associated axes to be sensed.

By way of further example, the type of sampled data set may include, or be based on, "relative motion" between two or more sensors to determine measurements like phase or misalignment.

By way of further example, depending on the frequency of data sampling, and the types or kinds of data sampling or measurements, the sample data set can become a very large and difficult to effectively transmit, depending on the wireless communication capacity and protocol, e.g., based on bandwidth and time constraints. In view of this, the selected subset of information may include some but not all of the sampled data, e.g., some of the type of stimuli (e.g., vibration along one or more axes), or some of the frequency of measurement (e.g., by sub-second, seconds, minutes, hours, days, etc.) of the stimuli, etc.

Moreover, consistent with that set forth above, different types or kinds of vibrating machines or structures may call for different types of data sampling sets. For example, for one type or class of vibrating machine or structure to be monitored, one type of sampled data set containing information about one type of stimuli may be captured, and one type of selected subset of information may be determined from the one type of sampled data set and provided as one type of relevant data for the one type of class of vibrating machine or structure. In contrast, for another type or class of vibrating machine or structure to be monitored, another type of sampled data set containing information about another type of stimuli may be captured, and another type of selected subset of information may be determined from the another type of sampled data set and provided as another type of relevant data for the another type of class of particular vibrating machine or structure.

In effect, the scope of the invention is not intended to be limited to any particular type or kind of vibrating machine or structure to be monitored, any particular type or kind of stimuli to be measured or sensed for any particular vibrating machine or structure, any particular frequency of measurement of the stimuli for any particular vibrating machine or structure, or the frequency of the provisioning of the measurements for any particular vibrating machine or structure, etc. Moreover, the scope of the invention is intended to include types or kinds of either vibrating machine or structure to be monitored, or stimuli to be measured or sensed for any particular vibrating machine or structure, that are now known and later developed in the future.

Signal Processing Algorithm

A person skilled in the art would appreciate that signal processing algorithms are known in the art, including signal processing algorithms like a data interpretation algorithm or a webbed-nodal connection algorithm.

By way of example, a person skilled in the art would be able to implement a data interpretation algorithm to process a sample data set and provide a pre-selected subset of information from the sample data set as relevant data without undue experimentation, based on that disclosed in the present application along with that known in the prior art. For example, a person skilled in the art would be able to implement a data interpretation algorithm to process a sample data set and provide a pre-selected subset of information from the sample data set as relevant data having some subset of the sampled data set, e.g., based upon a data interpretation algorithm or a webbed-nodal connection algorithm.

Moreover, and by way of example, a person skilled in the art would also be able to implement a webbed-nodal connection algorithm to exchange sampled data sets from respective data collectors or sensors like elements 12, provide the same to a system or collector node like element 14, as well receive and disseminate local web nodal commands to such data collectors and sensor like element 12 received from such a system or collector node like element 14, without undue experimentation, based on that disclosed in the present application along with that known in the prior art.

The scope of the invention is not intended to be limited to any particular type or kind of any such data interpretation algorithm, or any such webbed-nodal connection algorithms, either now known or later developed in the future. For example, data interpretation algorithms or webbed-nodal connection algorithms may be known in the art and suitably adapted to implement the signal processing requirements of the present invention.

The Vibrating Machine or Structure

Vibrating machines or structures, e.g., like pumps or rotary devices, reciprocating machines, engines, blowers, are known in the art, and are not described in detail herein. Moreover, the scope of the invention is not intended to be limited to any particular type or kind thereof that is either now known or later developed in the future.

Synching

Synching is understood to be the ability to synch vibration signaling with another signal or sensor within the data collector or web. In effect, in some embodiments synched sensor results may better identify relevant data than vibration sensing alone, depending on the particular application.

By way of example, three important synchs may include temperature, time and GPS location. For instance, the scope of the invention is intended to include embodiments where the vibration signaling may be synched with another sensor such as a temperature sensor or a clock (time). In this case, in some embodiments, a temperature measurement may be taken together with a vibration measurement. Alternatively, in some embodiments, two sensor may be configured to take a vibration measurement at substantially the same time. The scope of the invention is also intended to include, and embodiments are envisioned, using sensor(s) that are now known as well as those later developed in the future.

Moreover, embodiments are also envisioned, and the scope of the invention is intended to include, also using temperature as a component of a dynamic data acquisition system.

Data Collector and Sensor Functionality

According to some embodiments, and by way of example, the data collector and sensor may be configured to implement analog front end functionality, analog signal control functionality, signal analysis functionality, and signal intelligence functionality. The respective functionality may be associated with specific hardware, actions to be taken, and relevant change configurations.

In particular, the analog front end functionality in relation to specific hardware may include functionality associated with a sensor (e.g., which signals of a 6 degrees-of-freedom (DOF) vibration sensor are relevant), analog filter (e.g. a minimum sampling frequency signal), $|_{[c1]}$ power supply or battery (e.g., a frequency of measurement). The analog front end functionality in relation to specific actions may include functionality to collect an analog signal that can be sent to an analog-to-digital converter (ADC). (As a person skilled in the art would appreciate and understand, the term "frequency" as used herein may be understood to be the frequency, e.g., either that the A/D collects information from a vibration stimuli (generally measured in many Hz or cycles per second), or that the monitoring device turns on (generally measured in hours, weeks, etc.).)

The analog signal control functionality in relation to hardware may include functionality associated with an ADC, a clock or radio. The analog signal control functionality in relation to specific actions may include functionality associated with controls re when a signal needs to be collected, controls re signal analog to digital conversion, controls the duration of a signal, or synching measurements with other sensors. Examples of specific actions may include analog signal control related to high vs. low data sampling. The relevant change configurations may include, or relate to, the sampling frequency, the sampling duration, the analog to digital resolution, the selection of specific sensors, or synching multiple measurements.

The signal analysis functionality in relation to hardware may include functionality associated with implementing the signal processor. The signal analysis functionality in relation to specific actions may include functionality to improve the signal received with digital correction, to perform analysis on the signal (e.g., converting the signal to information), or to provide data classification, data validation, or data storage. Examples of specific actions may include signal analysis related to frequency domain analysis. The relevant change configurations may include, or relate to, the method or level of digital correction, or dynamic algorithms that analyze the signal and convert it into relevant information.

The signal intelligence functionality in relation to hardware may include functionality associated with a logic processor. The signal intelligence functionality in relation to specific actions may include functionality to extract condition criteria from a raw or analyzed signal, or to select data for transmission. Examples of specific actions may include the provisioning of one or more machine alarm conditions from the signal analysis, including providing indicators like "Alarm," "Watch" or "OK." The relevant change configurations may include, or relate to, set criteria that identifies information from the signal that is deemed to be relevant, radio communications, (e.g., two-way communications), or radio broadcast (e.g., one-way communication).

The scope of the invention is intended to include, and embodiments are envisioned in which, there is overlapping functionality between the data collector or sensor and the system or collection node related to at least some signal analysis functionality and some signal intelligence functionality, e.g., consistent with that set forth herein.

System or Collection Node Functionality

According to some embodiments, and by way of example, the system or collection node may be configured to implement analog signal analysis functionality and signal intelligence functionality. The respective functionality may be associated with specific hardware, actions to be taken, and relevant change configurations.

In particular, the signal analysis functionality in relation to hardware may include functionality associated with implementing the signal processor. The signal analysis functionality in relation to specific actions may include functionality to improve the signal received with digital correction, to perform analysis on the signal (e.g., converting the signal to information), or to provide data classification, data validation, or data storage. Examples of specific actions may include signal analysis related to frequency domain analysis. The relevant change configurations may include, or relate to, the method or level of digital correction, or dynamic algorithms that analyze the signal and convert it into relevant information.

The signal intelligence functionality in relation to hardware may include functionality associated with implementing a logic processor. The signal intelligence functionality in relation to specific actions may include functionality to extract condition criteria from a raw or analyzed signal, or to select data for transmission. Examples of specific actions may include the provisioning of one or more machine alarm conditions from the signal analysis, including providing indicators like "Alarm," "Watch" or "OK." The relevant change configurations may include, or relate to, set criteria that identifies information from the signal that is deemed to be relevant, radio communications, (e.g., two-way communications), or radio broadcast (e.g., one-way communication).

The scope of the invention is intended to include, and embodiments are envisioned in which, there is overlapping functionality between the data collector or sensor and the system or collection node related to at least some signal analysis functionality and some signal intelligence functionality, e.g., consistent with that set forth herein.

Central or Cloud Server Functionality

According to some embodiments, and by way of example, the central or cloud server may be configured to implement aggregate signal analysis functionality. The respective functionality may be associated with specific hardware, actions to be taken, and relevant change configurations.

In particular, the aggregate signal analysis functionality in relation to hardware may include functionality associated with the central or cloud server. The aggregate signal analysis functionality in relation to specific actions may include functionality to combine and organize aggregate data, or control analysis and intelligence subsystems. Examples of specific actions may include signal analysis related to aggregate signal or signaling analysis that helps identify improved relevant detection. The relevant change configurations may include, or relate to, archive data, signature definitions, or aggregate data analysis.

Example of Software Algorithm

1 Overview

By way of example, the following summarizes a software algorithm containing functions and operations for the implementing a data collector, sensor or device, according to some embodiments of the present invention.

2 Approach/SOW

By way of example, the software algorithm may be implemented on, or in relation to, or using the following hardware system/configuration and associated functionality.

2.1 Technical Approach

By way of example, FIG. 4A shown a block diagram of circuitry for implementing a hardware system/configuration generally indicated as 100, according to some embodiments of the present invention.

2.2 Alarm Levels

By way of example, alarm level functionality may be implemented based upon the following:

The alarm levels may be temperature and vibration thresholds that, when exceeded, cause the data collector, sensor or device to enter an alarm mode. In most cases, these may be thresholds based on the type or kind of vibrating machine or structure, e.g., such as a pump type and motor power.

The thresholds may be set by a user at a node based on the pump serial number and access to the central or cloud server.

The software may be implemented to set an initial vibration threshold, e.g., to 0.005588 meters per second (approximately 0.22 inches per second).

The software may be implemented to store alarm levels for x vibration, y vibration, and z vibration as well as any synched sensors when alarm criteria are reached, e.g. when alarm criteria are met, multiple sensor data sets are stored with dynamic data. This will allow the user to set alarm levels manually or via a serial number lookup for the pump type or though automated baseline methods of threshold detection.

In some embodiments, the software may be implemented to set the current temperature, x vibration, y vibration, and z vibration values as the alarm levels when a baseline request is received.

By way of example, some combination of these vibration thresholds, choice of axes, frequency of measurement, temperature setting, and actual sampled measurements, as well as the associated computational signal processing thereof, related to the alarm level functionality may be pre-set and redefined as part of the adaptive relevant data scheme, according to some embodiments of the present invention.

2.3 Data Storage

By way of example, data storage functionality may be implemented based upon the following:

The software may be implemented to store temperature and vibration levels data, e.g., once per hour for 60 days. These stored values may be collected by a ADC like element 106 in FIG. 4 which is connected to the. In some embodiments, the vibration values collected every 5 minutes by the MSP are not stored, although the scope of the invention is intended to be limited to whether the collected vibration values are stored or not, or how often any such storage may be implemented.

The software may be implemented to calculate once per hour data the RMS values using 0.25 s of data.

The software may be implemented to include a timestamp on all stored data.

The software may be implemented to replace the oldest data with the newest data when storage limits are reached.

The software may be implemented to store characters to be used as system identification information. The software may be implemented to update this information upon receipt of a system command message. In addition, the software may be implemented to send this information to the a system node upon request. By way of example, the system identification information is typically not used for any further software-based signal processing, but provides qualitative information such as equipment configuration that can be relevant to the analysis of data.

By way of example, some combination of these parameters and associated computational signal processing thereof related to the data storage functionality may be pre-set and redefined as part of the adaptive relevant data scheme, according to some embodiments of the present invention.

2.3.1 Data Storage—Counters

By way of example, data storage counter functionality may be implemented based upon the following:

The software may be implemented to increment, once per hour, counters for "Hours Running," "Hours Idle," "Hours In-Alarm," if the increment criteria for those counters has been met.

The software may be implemented to increment the "Hours Running" counter if the RMS vibration levels are within 10% of the current alarm levels. Alternatively, the software may be implemented to increment "Hours Running" if some other $|_{[NL2]}$ parameter that may also be deemed relevant.

The software may be implemented to increment the "Hours-In-Vibration-Alarm" if the current vibration measurements exceed the alarm levels.

The software may be implemented to increment the "Hours-In-Temperature-Alarm" if the current temperature measurement exceeds the alarm level.

The software may be implemented to reset the "Hours Running" counter upon receipt of a system command message. By way of example, the command message may be received from the mobile app.

The software may be implemented to increment, once per hour, a counter for electrical "Runtime" of the collector node, sensor or device. This counter will typically be incremented since it indicates how many hours the collector node, sensor or device has been active (i.e. with power applied). This counter will typically not be reset. For instance, one purpose of this counter is to allow the mobile app to measure and possibly predict battery life.

By way of example, some combination of these parameters and associated computational signal processing thereof related to the data storage counter functionality may be pre-set and redefined as part of the adaptive relevant data scheme, according to some embodiments of the present invention.

2.3.2 Data Storage—Alarm

By way of example, data storage alarm functionality may be implemented based upon the following:

When an alarm is detected, the software may be implemented to store a Time Waveform (TWF) of the raw signal, a measure of overall energy such as Root-Mean-Square (RMS) vibration, the Fast Fourier Transform (FFT), other analysis methods.

The software may be implemented to keep in memory the most recent or most significant alarm readings. By way of example, the software may be keep the three most recent FFT's and the highest energy FFT in the past year.

By way of example, some combination of these parameters and associated computational signal processing thereof related to data storage alarm functionality may be pre-set and redefined as part of the adaptive relevant data scheme, according to some embodiments of the present invention.

2.3.3 Data Storage—Data Aggregation

By way of example, data storage of routine data may be condensed to the following:

Once per hour, the software may be implemented to store the RMS x, y, and z vibration of a triaxial vibration sensor synched with temperature values across all times when the vibrating machine or structure was running.

The software may be implemented to aggregate hourly data to weekly data that contains the maximum, minimum, average, or other statistical measure (e.g. percentile or standard deviation) and store the aggregated data with more effectiveness over extended periods of time, e.g., 5 years of daily average data would appear more effectively.

By way of example, some combination of these parameters and associated computational signal processing thereof related to the data storage daily average functionality may be pre-set and redefined as part of the adaptive relevant data scheme, according to some embodiments of the present invention.

2.4 Radio Advertising Packet Updates

By way of example, Bluetooth®, a radio protocol that has the ability to advertise information in a packet may update functionality based upon the following:

The software may be implemented to store the current x, y, z vibration and temperature data in the radio memory as opposed to onboard storage, with the advertising packet changing upon receipt of a System Command message. For example, this will allow the data collector, sensor or device to be used as a vibration measurement device when commanded by the mobile app.

The software may be implemented to update the data in the advertising packet at a given frequency, e.g. every hour. Radio compatible nodes would be able to read this data without initiating a radio connection.

For example, a 16-byte status word may be incorporated into the advertising packet. The status word may be defined to contain summary information about the status of the equipment being monitored. For example, a status word can provide vibration RMS levels, alarm condition and/or equipment name.

By way of example, some combination of these parameters and associated computational signal processing thereof related to the radio advertising packet update functionality may be pre-set and redefined as part of the adaptive relevant data scheme, according to some embodiments of the present invention.

2.5 Multiple Measurements

By way of example, measurement functionality may be implemented based upon the following:

The software may be implemented to compare current x, y, and z vibration and synched sensors levels to alarm criteria. A lower-resolution measurement can coarsely be performed e.g. to conserve power, which allows high-resolution measurements for alarm situations.

By way of example, the software may be implemented to put the data collector into low resolution measurements to conserve power, but move to high resolution measurements when Alarm criteria have been detected. In Alarm mode, the software may be implemented to adjust its processing to help the user realize that the specific needs of the machinery or structure.

Whenever the vibrating machine or structure is not in an Alarm Mode, it is understood to be in a Normal Mode.

By way of example, some combination of these parameters and associated computational signal processing thereof related to the measurement functionality may be pre-set and redefined as part of the adaptive relevant data scheme, according to some embodiments of the present invention.

2.5.1 Entering Alarm Mode

By way of example, entering alarm mode functionality may be implemented based upon the following:

If the low resolution vibration level measured, e.g., every five minutes, exceeds the alarm threshold measurements, the software may be implemented to put the data collector into a high resolution mode to confirm the Alarm. If the alarm is confirmed with high resolution measurements, the device may enter an alarm state. If the alarm is rejected, the low resolution measurement may be ignored or recalibrated to prevent further false alarms.

By way of example, some combination of these parameters and associated computational signal processing thereof related to the entering alarm mode functionality may be pre-set and redefined as part of the adaptive relevant data scheme, according to some embodiments of the present invention.

2.5.2 Return to Normal Mode

By way of example, return to normal mode functionality may be implemented based upon the following:

If the x-vibration level, y-vibration level, z-vibration level measured every five minutes with a low resolution measurement is less than or equal to the alarm thresholds and the unit is currently in an alarm state, the software may be implemented to put the data collector, sensor or device in the Normal Mode or confirm the return to Normal Mode with a high-resolution measurement using different software or hardware within the measurement device.

By way of example, some combination of these parameters and associated computational signal processing thereof related to the return to normal mode functionality may be pre-set and redefined as part of the adaptive relevant data scheme, according to some embodiments of the present invention.

2.6 Alarm Light Control

By way of example, Light control functionality may be implemented based upon the following:

The software may be implemented to blink a red light, e.g., every 5 seconds, if the data collector, sensor or device is in the Vibration Alarm Mode.

The software may be implemented to blink the green LED, e.g., every 5 seconds, when the most recent measurements do not exceed alarm levels for vibration or synched sensors and less than two consecutive measurements that exceed alarm levels have been recorded.

The software may be implemented to blink the blue LED, e.g., every 5 seconds, when the wireless pairing is being performed between the data collector and a node.

By way of example, some combination of these parameters and associated computational signal processing thereof related to the Light control functionality may be pre-set and redefined as part of the adaptive relevant data scheme, according to some embodiments of the present invention.

2.7 FFT Definition

By way of example, FFT functionality may be implemented based upon the following:

The software may be implemented to calculate an FFT, a possible high resolution measurement of vibration, on the high-resolution data collected on the x, y, and z axes of the accelerometer, as defined in section 2.3.2 herein. By way of example, this section defines requirements for the FFT signal processing.

By way of example, the software may be implemented to calculate FFT using the known standard IEST-RD-DTE012.2.

The software may be implemented to take, e.g., 10 s (or more) of data which may be synchronously or asynchronously averaged together to create the final FFT output.

The software may be implemented to use a Hanning window on each of the overlapped FFTs.

The software may be implemented to output calibrated or uncalibrated FFT's whereas uncalibrated measurements would be postponed to a node or the central or cloud server.

The software may be implemented to output different units of the FFT, whereas to persons familiar with the art and without any undo computations, to any units of motion such as acceleration (g's, $g^2$/Hz), velocity (in/s mm/s, $(in/s)^2$/Hz)) or displacement (in, mm, $in^2$/Hz, $mm^2$/Hz).

By way of example, some combination of these parameters and associated computational signal processing thereof related to the FFT functionality may be pre-set and redefined as part of the adaptive relevant data scheme, according to some embodiments of the present invention.

3 Mobile Interface Design

As a person skilled in the art would appreciate, the data collector, sensor or device may be configured with "System Parameters" interfaces between the firmware of the data collector, sensor or device and the mobile application, without undue experimentation. The scope of the invention is not intended to be limited to any particular type or kind of implementation for achieving any such "System Parameters" interfaces.

4 Some Additional Scenarios

By way of example, some additional scenarios may be implemented consistent with that set forth herein, and based upon the following:

4.1 Scenario 1: 5-Second Advertising Interval

One scenario may include, or be implemented with, the radio transmitting its advertising packet at 5 second intervals, whereas vibration information is presented to users without then need to pair radios.

4.2 Scenario 3: Low-Resolution Measurements, High-Resolution Measurements

Similarly, in second scenario the software may be implemented to use a lower resolution measurement with higher frequency (e.g. settable parameter typically 5 minutes, which can be increased or decreased based upon relevance) in order to collect more data with less resources of the data acquisition device, and compare measurements to high-resolution low-frequency measurements (e.g. settable parameter typically greater than one day, which can be increased or decreased based upon relevance). Comparison of the two measurements of the same phenomena permit higher greater utility of measurements without consumption of data acquisition resources.

4.3 Scenario 4: Data in Memory if Alarm is Triggered

In a fourth scenario, the software may be implemented to enable a storage of data when Alarm Criteria are triggered, active, or returning to normal. In this scenario, the software may be implemented to allow the processor to repeatedly store time domain data or any other vibration measurement in memory every time the vibration stimuli indicate alarm.

FIG. 6

Figure 6:
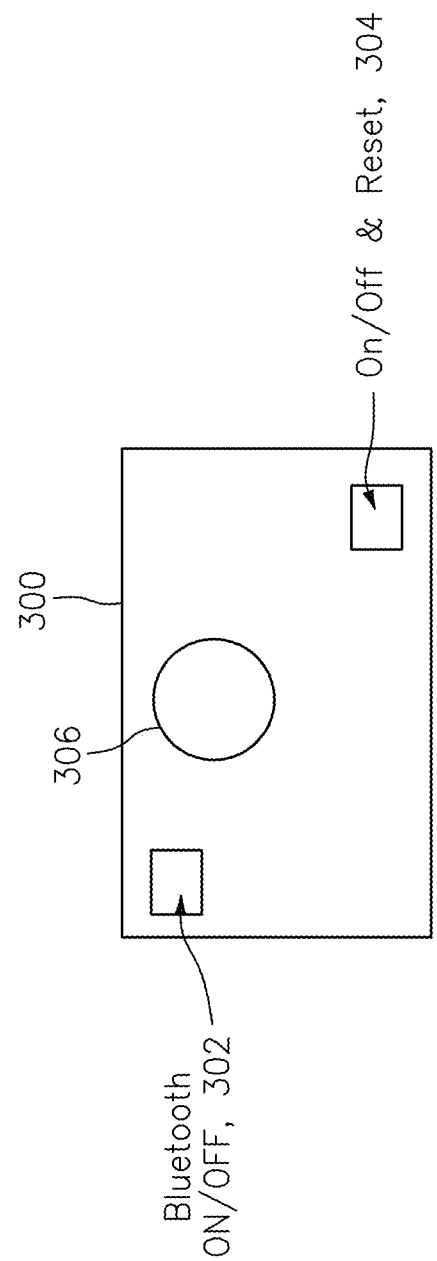
FIG. 6 is a diagram of an implementation based upon Hall-effect sensing that allows for user interaction using a magnet.

FIG. 6 shows an implementation of a monitoring device 300 based upon Hall-effect sensing that allows for user interaction using a magnet. The monitoring device 300 includes a Bluetooth on/off 302 and an on/off reset 304 that may be toggled by the user using the magnet. The monitoring device 300 also includes a bezel 306 for providing a visual LED indication of functionality associated with the monitoring device 300.

Possible Applications

Possible applications include at least the following: Nodal and web configurations.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

We claim:

1. A system for monitoring a vibrating machine or structure, including a nodal dynamic data acquisition and dissemination system, comprising:
    a data collector or sensor having a signal processor configured to:
        receive sensed and collected data signaling containing information about stimuli caused by a vibrating machine or structure and capture a sampled data set containing information about the stimuli, including where the stimuli include at least vibration of the vibrating machine or structure sensed by an accelerometer along at least one axis; and
        provide or transmit wireless signaling containing
            a selected subset of the information from the sampled data set that can be provided as relevant data that includes a relevant data package/sample,
            a size of the relevant data package/sample, and
            computations upon the relevant data package/sample,
        wherein the signal processor is configured to implement a data interpretation algorithm that defines the selected subset of the information from the sampled data set, and wherein the data interpretation algorithm depends on a wireless communication capacity or protocol for communication.

2. A system according to claim 1, wherein the signal processor is configured to determine the wireless signaling containing the selected subset of information from the sampled data set that can be provided as the relevant data, that includes the relevant data package/sample, the size of the relevant data package/sample, and the computations upon the relevant data package/sample, based upon the sensed and collected data signaling.

3. A system, according to claim 1, wherein the system comprises at least one data collector or sensor having the signal processor arranged therewith and configured for mechanical coupling to the vibrating machine or structure to be monitored, including a pump or rotary device.

4. A system according to claim 1, wherein the signal processor is configured to preset the selected subset of information representative and sufficient for most situations for monitoring a generic kind of vibrating machine or structure.

5. A system according to claim 1, wherein
the signal processor is configured to receive, via a back communication channel, wireless control signaling containing information to change content of the selected subset of information based upon continuous evaluation of the relevance of the data collected.

6. A system according to claim 5, wherein the system comprises:
a collection node configured to receive and provide, via the back communication channel, the wireless control signaling.

7. A system according to claim 1, wherein the transmission of the wireless signaling is limited by either available bandwidth or time related to the wireless communication capacity or protocol.

8. A system according to claim 1, wherein the signal processor is configured to provide the wireless signaling as a stream of real time or stored data.

9. A system according to claim 1, wherein the system comprises multiple data collectors or sensors, each data collector or sensor having a respective signal processor(s) and being coupled to a respective vibrating machine or structure to be monitored, each signal processor configured to provide respective wireless signaling containing a respective selected subset of information that can be provided as respective relevant data, including when some measurements are made with respect to other measurements.

10. A system according to claim 9, wherein the multiple data collectors or sensors are configured to be synched to provide transmissions of the respective wireless signaling, including where the transmissions are across an industrial plant and in the form of a webbed-node collection to a base station.

11. A system according to claim 9, wherein the system comprises a collection node comprising a collection node signal processor configured to receive the respective wireless signaling, identify or downselect the respective relevant data, and provide collection node signaling containing the respective relevant data.

12. A system according to claim 11, wherein the collection node comprises, or takes the form of, a wireless device, including where the wireless device is a smart phone, iPad, tablet, laptop computer, desktop computer, personal digital assistant (PDA) device, router, wireless repeater or base station.

13. A system according to claim 12, wherein the wireless device is configured with Internet communications protocol capability.

14. A system according to claim 11, wherein the system comprises a central or cloud server configured to receive the collection node signaling containing the respective relevant data, including where the central or cloud server stores and interprets the relevant data.

15. A system according to claim 9, wherein the multiple data collectors are configured with a webbed-nodal connection so that the multiple data collectors or sensors are able to cross-communicate and transmit the respective relevant data from one data collector or sensor at one location to a next data collector or sensor at a next location to a viable Internet connection point at another location.

16. A system according to claim 15, wherein each multiple data collector or sensor is configured to implement a webbed-nodal connection algorithm to enable said each multiple data collector or sensor to cross-communicate and transmit the respective relevant data received from a respective one data collector or sensor to either a respective next data collector or sensor or the viable Internet connection point.

17. A system according to claim 9, wherein the multiple data collectors or sensors are configured to synch data collector transmission signaling so that the respective relevant data from each multiple data collector or sensor flows from respective locations to Internet access points, including where the multiple data collectors or sensors and the Internet access points form a localized web having webbed data collectors or sensors.

18. A system according to claim 17, wherein the apparatus comprises:
a collection node comprising a collection node signal processor configured to receive the data collector transmission signaling and provides collection node signaling containing information about compiled respective relevant data from each multiple data collector or sensor.

19. A system according to claim 18, wherein the system comprises a central or cloud server having a central or cloud server signal processor configured to receive the collection node signaling and store and interpret the compiled respective relevant data from each multiple data collector or sensor.

20. A system according to claim 19, wherein the central or cloud server signal processor is configured to identify critical data necessary for optimal dynamic data collection and interpretation, and provides central or cloud server signal processor signaling containing information about a new data interpretation algorithm.

21. A system according to claim 20, wherein the collection node signal processor is configured to receive the central or cloud server signal processor signaling, and provide the collection node signal processor signaling containing information such information to one or more webbed data collectors or sensors in the nodal web, including local web disseminated commands.

22. A system according to claim 21, wherein the multiple data collectors or sensors are configured to receive and provide local web disseminated commands to the webbed data collectors or sensors, including where the local web disseminated commands contain a new or updated data interpretation algorithm in order to implement modified or optimum dynamic data collection and interpretation to re-define the selected subset of information and improve the interpretation of dynamic data in comparison to the relevant data previously collected and interpreted.

23. A system according to claim 22, wherein the respective signal processor is configured to receive the local web disseminated commands containing the new or updated data interpretation algorithm and implement the optimum dynamic data collection and interpretation to re-define the selected subset of information and improve the interpretation of dynamic data in comparison to the relevant data previously collected and interpreted.

24. A system according to claim 1, wherein the system comprises a collection node having a collection node signal processor configured to receive the wireless signaling, identify the relevant data, and provide collection node signaling containing the relevant data.

25. A system according to claim 24, wherein the collection node signal processor is configured to provide summary relevant data to a user, including where the collection node is a wireless device configured to implement an application or app to display the summary relevant data to the user.

26. A system according to claim 24, wherein the collection node comprises a wireless device having Internet communications protocol capability, including where the wireless device is a smart phone, iPad, tablet, laptop computer, desktop computer, personal digital assistant (PDA) device, router, wireless repeater or base station.

27. A system according to claim 24, wherein the system comprises a central or cloud server configured with a central or cloud server signal processor configured to receive the collection node signaling containing the relevant data, and store and interpret the relevant data.

28. A system according to claim 27, wherein the central or cloud server is configured to determine a new or updated data interpretation algorithm based upon interpretation of the relevant data, the new or updated data interpretation algorithm to redefine the information from the sampled data set to be included in the subset to be provided as relevant data.

29. A system according to claim 28, wherein the central or cloud server signal processor is configured to identify critical data necessary for optimum dynamic data collection and interpretation, and provide central or cloud server signaling containing information about the new or updated data interpretation algorithm.

30. A system according to claim 29, wherein the collection node signal processor is configured to receive the central or cloud server signaling containing information about the new or updated data interpretation algorithm, and provide corresponding collection node signaling containing information about the new or updated data interpretation algorithm.

31. A system according to claim 30, wherein the signal processor is configured to receive the corresponding collection node signaling containing information about the new or updated data interpretation algorithm and implement the optimum dynamic data collection and interpretation to redefine the selected subset of information and improve the interpretation of dynamic data in comparison to the relevant data previously collected and interpreted.

32. A system according to claim 1, wherein the system comprises the accelerometer configured to sense the at least vibration of the vibrating machine or structure along the at least one axis, and provide associated signaling containing information about the at least vibration sensed.

33. A method for monitoring a vibrating machine or structure, comprising:
receiving, with a signal processor, signaling containing information about stimuli caused by a vibrating machine or structure and capturing a sampled data set containing information about the stimuli, including where the stimuli include at least vibration of the vibrating machine or structure; and
providing or transmitting, with the signal processor, wireless signaling containing information about
a selected subset of the information from the sampled data set that can be provided as relevant data that includes a relevant data package/sample,
a size of the relevant data package/sample, and
computations upon the relevant data package/sample,
wherein the method further comprises defining the selected subset of the information from the sampled data set by implementing a data interpretation algorithm that depends on a wireless communication capacity or protocol for communication.

34. A method according to claim 33, wherein the method comprises configuring a data collector or sensor with the signal processor arranged therein and coupling the data collector or sensor to the vibrating machine or structure to be monitored.

35. A method according to claim 33, wherein the method comprises presetting with the signal processor the selected subset of information representative and sufficient for most situations for monitoring the vibrating machine or structure.

36. A method according to claim 33, wherein the method comprises configuring the signal processor to receive, via a back communication channel, wireless control signaling containing information about a different selected subset of information that may be more effective for analysis and conclusions regarding the vibrating machine or structure to be monitored than the selected subset of information.

37. A method according to claim 36, wherein the method comprises configuring a collection node with a collection node signal processor to provide the wireless control signaling containing information about the different selected subset of information.

38. A method according to claim 33, wherein the method comprises configuring the signal processor to provide the wireless signaling containing the selected subset of information based upon the wireless communication capacity or protocol.

39. A method according to claim 33, wherein the method comprises configuring a collection node to synch data collection activities with other sensors or measurement devices.

* * * * *